ERROR DETECTOR FOR DIGITAL COMMUNICATIONS

Filed April 8, 1958 7 Sheets-Sheet 1

INVENTORS
STANLEY A. FIERSTON
PAUL F. MARINO
BY
F. J. Sullivan
ATTORNEY

INVENTORS
STANLEY A. FIERSTON
PAUL F. MARINO
BY
F. W. Sullivan
ATTORNEY

CONTROL AND MESSAGE PULSES-TRANSMITTER SECTION $T_0 < \tau_1$

INVENTORS
STANLEY A. FIERSTON
PAUL F. MARINO
BY F. L. Sullivan
ATTORNEY

CONTROL AND MESSAGE PULSES - RECEIVER SECTION $T_0 < \tau_1 < \tau_2 < \tau_3 < \tau_4$ INVENTORS
STANLEY A. FIERSTON
PAUL F. MARINO
BY F. R. Sullivan
ATTORNEY

ERROR DETECTOR FOR DIGITAL COMMUNICATIONS

Filed April 8, 1958 7 Sheets-Sheet 5

UNDETECTED SINGLE MESSAGE ERROR

UNDETECTED DOUBLE MESSAGE ERRORS

INVENTORS
STANLEY A. FIERSTON
PAUL F. MARINO
BY F. L. Sullivan
ATTORNEY

ERROR DETECTOR FOR DIGITAL COMMUNICATIONS

Filed April 8, 1958 7 Sheets-Sheet 6

INVENTORS
STANLEY A. FIERSTON
PAUL F. MARINO
BY
F. L. Sullivan
ATTORNEY

ERROR DETECTOR FOR DIGITAL COMMUNICATIONS

Filed April 8, 1958 7 Sheets-Sheet 7

INVENTORS
STANLEY A. FIERSTON
PAUL F. MARINO
BY
F. D. Sullivan
ATTORNEY 3,159,809
ERROR DETECTOR FOR DIGITAL COMMUNICATIONS Stanley A. Fierston, Lynn, and Paul F. Marino, Burlington, Mass., assignors, by mesne assignments, to Sylvania Electric Products Inc., Wilmington, Del., a corporation of Delaware Filed Apr. 8, 1958, Ser. No. 727,103
13 Claims. (Cl. 340—146.1)

This invention is concerned with electronic digital data processing systems, and particularly with an improved means for detecting transmission errors in such systems having binary coded communication links.

Binary coded digital data handling systems process intelligence in radio or closed circuit links in the form of messages expressing, by the presence or absence (or by the amplitude) of successive signals, the ones and zeros of a binary code. The reliability of such systems is affected by the extent to which noise or other interference distorts the communicated signals sufficiently for ones to be mistaken for zeros and vice versa.

Errors in a plain text telegraphic message can generally be detected from the context of the message itself. With telemetering information, data take-offs, coded texts, etc., however, errors are generally not manifest; and, in the processing of data such as in the input or output of a complex computer system, a single zero mistaken for a one can seriously affect the efficiency of the entire system, especially when data incorporating a transmission error is used as the basis for a series of operations or calculations. For this reason, a communication link for a critical digital data processing system must be as error-proof as possible. Even in a system 99.99% accurate, one bit out of every 10,000 could be in error; and, at a transmission rate of $10^5$ bits per second, this could amount to 10 errors every second.

Hitherto, there have been two principal techniques employed for the detection of errors in such systems. One method is to convert the binary digits of the message at the transmitter into a coded word. At the receiver the word is accepted if it conforms with what the receiver has been conditioned to consider an acceptable word. If the message has been garbled during transmission to the extent that its digits have been changed into an unacceptable word, it is rejected. A typical example of this type of error detection is the classic 2-out-of-7 code used, for example, in telephone exchanges wherein decimal values from 0 to 9 are represented by two ones in various combinations of seven positions. Thus, every acceptable word has five zeros and two ones; and, if a word at the receiver has more or less than two ones it is rejected.

A second method of error detection is based upon what is termed "parity checking." In a parity checking system, an addition of the ones in each word of the message is made at the transmitter. If the total is odd (i.e. a one), another one is added to the message as a parity digit to provide what is termed an "even parity check." If the message itself has an even number of ones, a zero is added as the parity digit. A similar check is run at the receiver; and, if the parity digit received and the one locally generated fail to correspond, the message is rejected. An "odd parity check" can be provided by adding to the message the digit necessary to make the total odd (i.e. a one).

Both of these systems have given somewhat satisfactory performance within severe limitations. They can detect single isolated errors, and sometimes multiple errors, but are generally insensitive to double or self-compensating errors, e.g., when a one is mistaken for a zero and a zero for a one within the same message unit, or two ones for zeros, two zeros for ones, etc. Even when they can be made sensitive to some forms of double errors, however, the cost in bandwidth and complexity of equipment is prohibitive.

Peter Elias (Transactions of the IRE, 1954 Symposium on Information Theory, September 1954, p. 29; and the IRE 1955 National Convention Record, Vol. III, Part 4, p. 37) has proposed an error detection system of considerable promise. This system is described as "convolutional parity checking" because it provides a continuous bit-by-bit check on the digits of the message, using previously checked digits to verify presently incoming digits. Hitherto, however, the methods proposed for implementing this system have involved networks of "logical tree" arrangements of sum-modulo-two adders and the full potentiality of the system has not been realized.

Accordingly, it is an object of the present invention to provide an improved means for detecting transmission errors in digital communication systems. Other objects are to provide an improved device for implementing the Elias convolutional parity method of error detection, and an improved means for correlating digits at the transmitter and receiver sections of a digital communication system.

These and related objectives are accomplished in one embodiment of the invention featuring an error detection system which processes a message at the transmitter section of a communication system through a shift register having both its input stage and its output stage connected to a complementary flip-flop or other complementary bi-stable device. The flip-flop, in effect, performs a sum-modulo-two addition (i.e. a running addition without carry) of the binary digit contents of the register as each message digit is inserted in the system, and the sum is included in the message format as a parity checking digit following each message digit. A similar parity digit generating register and flip-flop combination is provided at the receiver section. If, at the receiver, the parity digits received and locally generated check, the message is accepted. If not, it is rejected.

Other forms and modifications of the invention will be apparent from the following description and reference to the accompanying drawings, in which.

Figure 5:
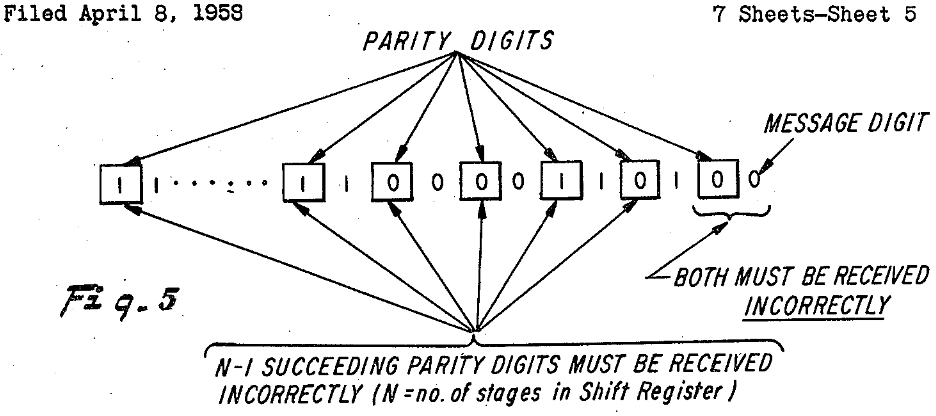
Figure 6:
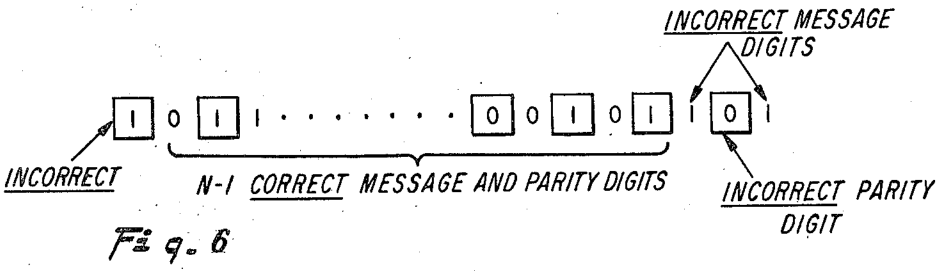
Figure 7:
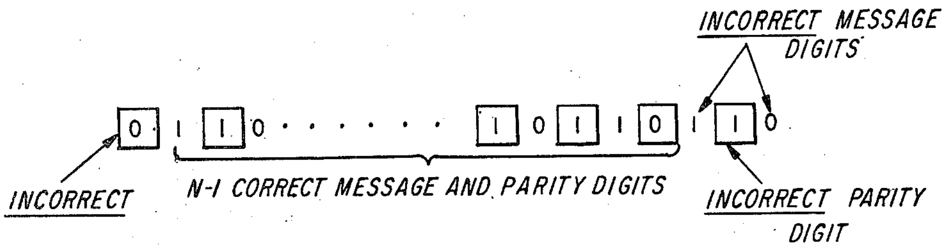
Figure 8:
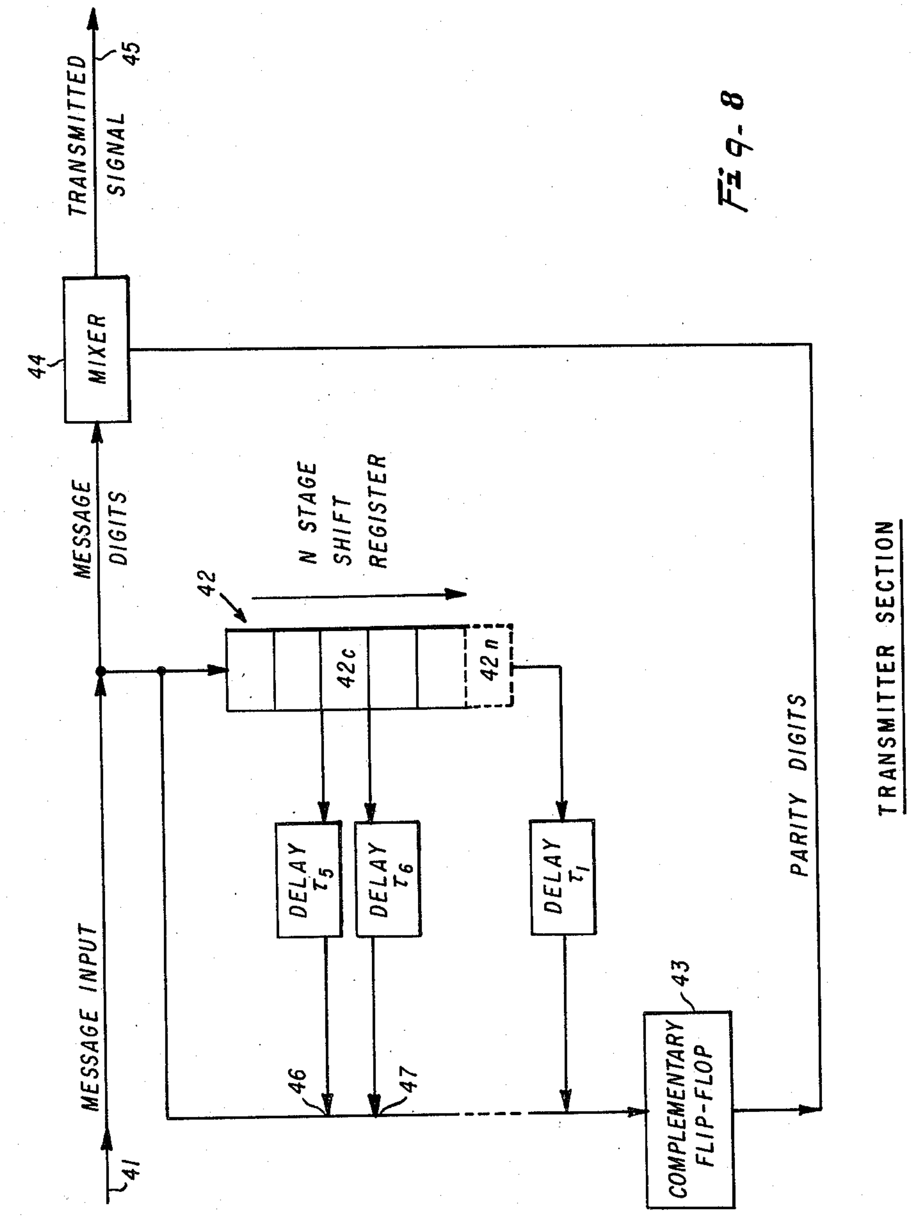
Figure 9:
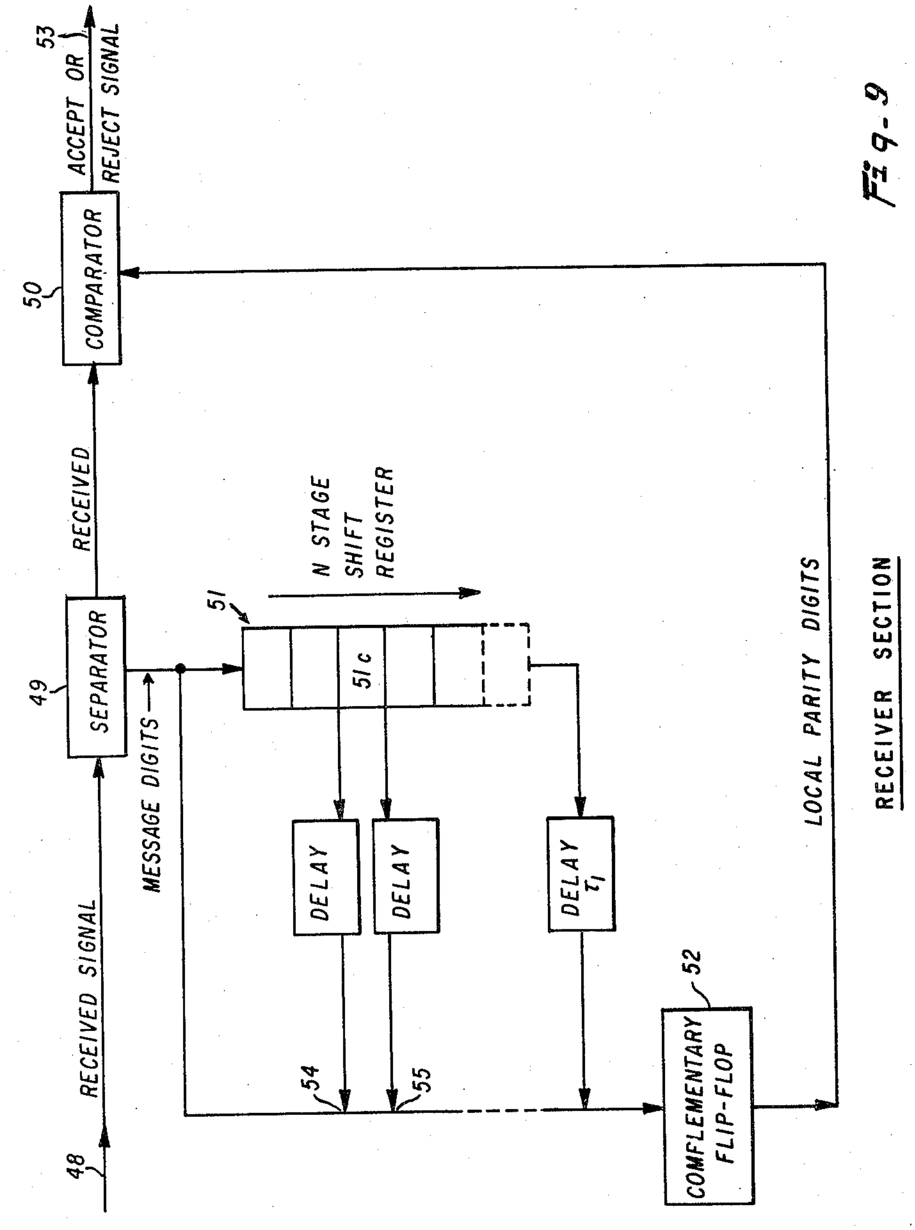

FIGS. 5, 6, and 7 are diagrammatic representations of message and parity digits, showing possible undetected errors;

FIG. 8 is a block diagram of the transmitter section of a modification of the invention designed to detect the errors of FIGS. 6 and 7; and, FIG. 9 is a similar block diagram of the receiver section of the same modification.

Figure 1:
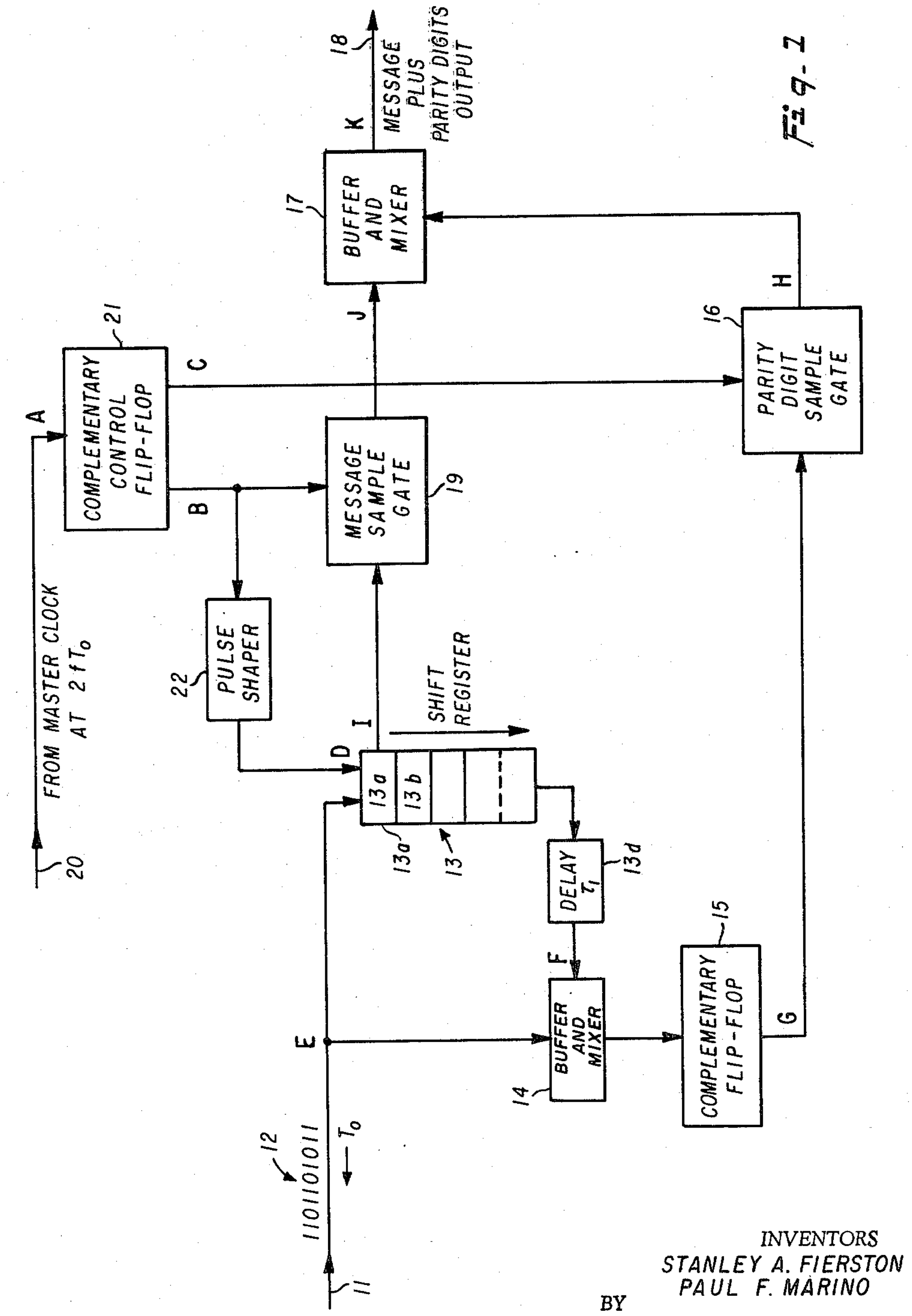
FIG. 1 is a block diagram of the transmitter section of an error detection system, after the manner of one embodiment of the invention.

The transmitter section of the error detection system, shown in FIG. 1, includes an input channel 11 for the message 12 to be transmitted. Input 11 is connected to the primary stage 13*a* of a shift register 13 and, through a buffer and mixer 14, to the input of a parity digit generating complementary (i.e. alternates its output each time, and only when, a one is applied to its input) flip-flop 15. The output of the flip-flop 15 is connected, through a parity digit sample gate 16, to a buffer and mixer 17, in turn connected to the transmitter output channel 18.

The signal level indicative of the message digit stored in the primary stage 13*a* of shift register 13 is conducted, through a message sample gate 19, to the mixer and buffer 17; and, the output of register 13 is connected through a delay device 13*d* and buffer 14, to the flip-flop 15.

Suitable control is provided so that the format of the transmitter output at 18 comprises a succession of message digits each followed by a parity digit. This control system is synchronized by pulses, through an input connection 20, from a master clock (not shown). Input 20 is connected to a complementary control flip-flop 21 which has one output connected through a pulse shaper 22 to provide shift pulses to register 13 and control pulses to message sample gate 19, and the other of its outputs connected to provide control pulses to the parity digit sample gate 16.

Figure 2:
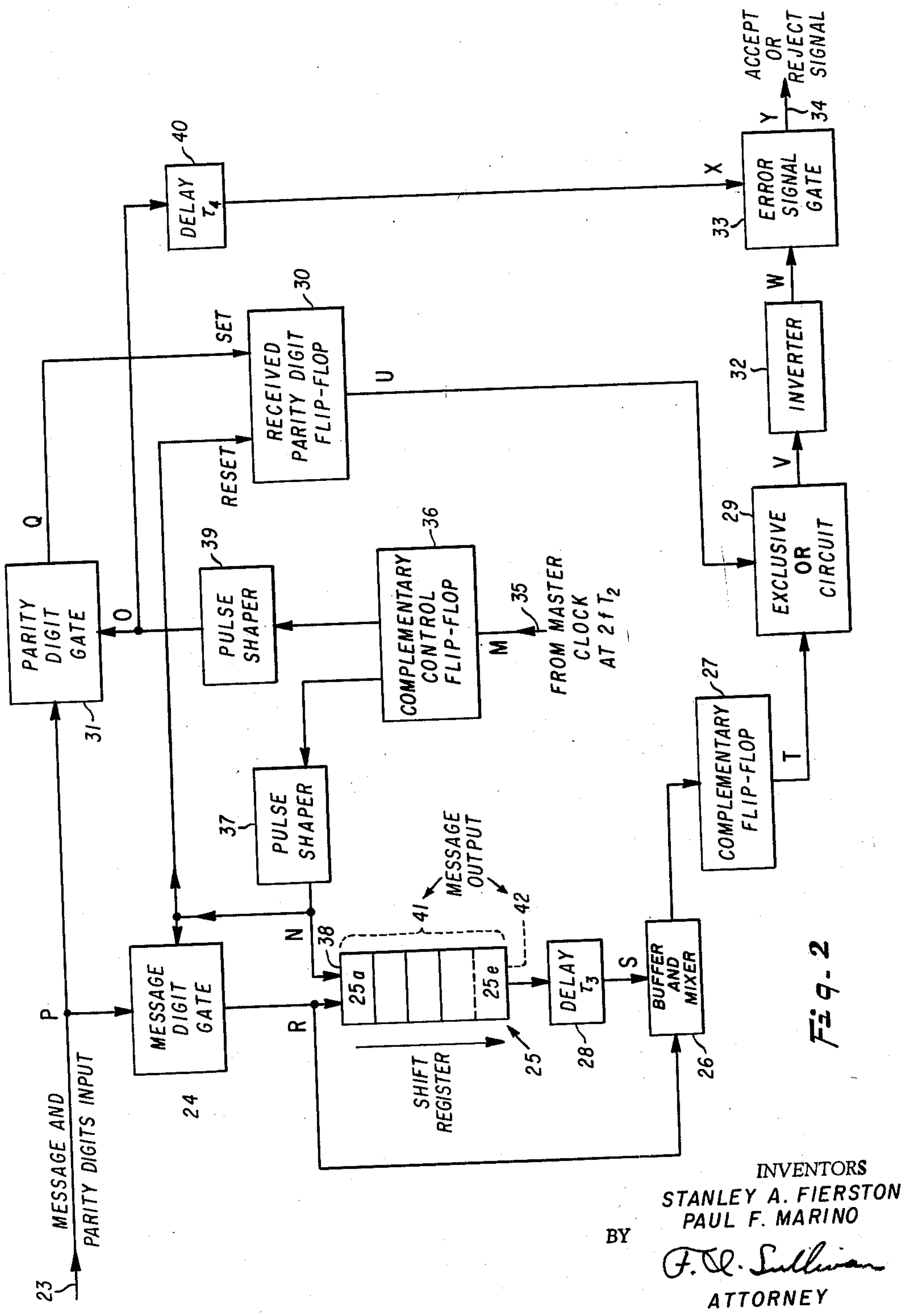
FIG. 2 is a similar block diagram of the receiver section of this error detection system.

The receiver error detection section, shown in FIG. 2, includes a received signal input channel 23, connected, through a message digit gate 24, to the first stage 25*a* of a shift register 25 and, through a buffer and mixer 26, to the input of a local parity digit generating complementary flip-flop 27. The output of the shift register 25 is also connected, through a delay device 28 and the buffer 26, to the input of the complementary flip-flop 27. This flip-flop has its output connected to an exclusive OR comparison circuit 29 which has its other input connected, through a received parity digit flip-flop 30, to a received parity digit gate 31 connected to the input 23.

The output of the exclusive OR comparison circuit 29 is connected, through an inverter 32 and an error signal gate 33, to an output terminal 34 whence message accepting or rejecting signals are derived.

The control system for this receiver section comprises an input 35 from a synchronizing device or master clock (not shown) connected to a complementary control flip-flop 36. One output of the flip-flop 36 is connected, through a pulse shaper 37, to the message digit gate 24 and to terminal 38 for providing shift pulses to the register 25.

The other output of the control flip-flop 36 is connected, through a pulse shaper 39, to the received parity digit gate 31 and, through a delay device 40, to the error signal gate 33.

The general operating scheme whereby the transmitting section of the error detection system shown in FIG. 1 and the receiver section shown in FIG. 2 cooperate to detect transmission errors (the confusion of ones with zeros and vice versa) between the two stations will now be described. As the successive digits of a message 12 enter the transmitter section via input 11, they are processed through the first stage 13*a* of shift register 13 to the mixer and buffer 17 where they have interlaced between them, each time a message digit enters the system, a parity digit derived from the flip-flop 15 under control of the output of shift register 13 and its associated parity digit producing circuits. This parity digit is the sum-modulo-two addition of the contents of register 13, produced by the flip-flop 15 complementing each time a one enters or leaves the register.

When the transmitted signals arrive at the receiving section via terminal 23, the message and parity digits are separated by gates 24 and 31. Then, the message digits are processed, through shift register 25 and its associated circuitry, to generate locally another set of parity digits which are applied to the exclusive OR comparison circuit 29 to which the parity digits received are also applied. If the received and locally generated parity digits are identical, the message is accepted; if they are not, it is rejected.

Since shift register 13 in the transmitter section and shift register 25, in the receiver section, both have a number of stages, and a check is performed as each message digit enters these registers, the parity digits are generated by comparing each incoming message digit with preceding digits which have already been checked and verified. Thus, an extremely accurate error check is provided in a manner described in more detail below. An essential feature of the system is that the parity digits generated at both the transmitter and receiver sections are the result of a sum-modulo-two addition of the already verified message digits comprising the contents of the respective shift registers.

Referring to FIGS. 1 and 2, the various pulses processed and generated in the transmitter section of the error detector are shown and designated A–K.

The pulses A from the master clock 20 are applied to the input of the complementary flip-flop 21. These pulses are generated at twice the incoming message bit frequency and, therefore, permit the control flip-flop output pulses B and C to provide a message sample gate control B during the message digit interval, and a parity digit sample gate control C during the interval between message input pulses.

The message gate control B from flip-flop 21, in addition to controlling the message sample gate 19, is also connected through pulse shaper 22 to provide the shift pulses D for processing the message digits through the shift register 13.

Figure 3:
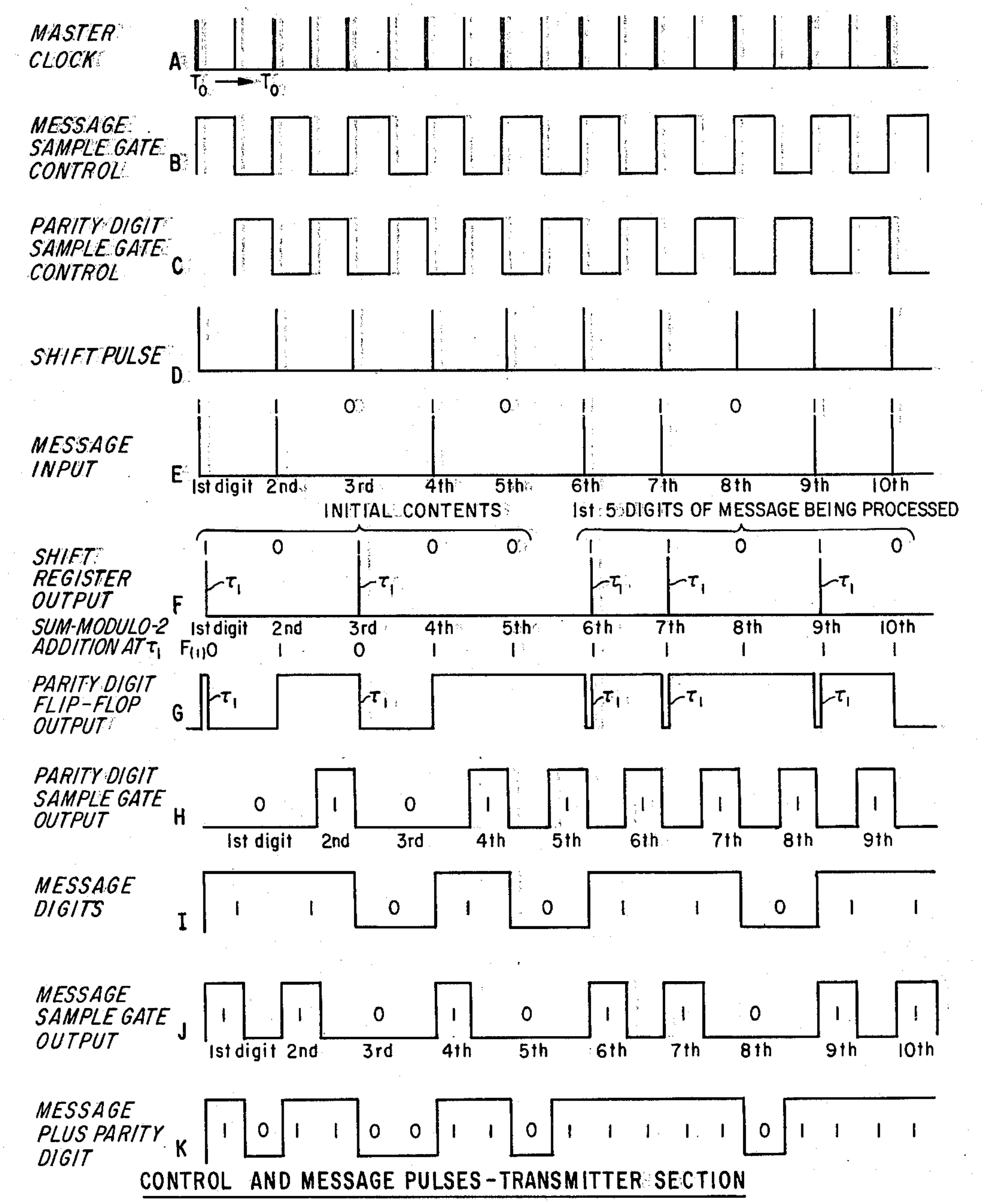
FIG. 3 is a diagrammatic representation of signal and control pulses at different points in the block diagram of FIG. 1.

Assume an arbitrary message input 1 1 0 1 0 1 1 0 1 1, the ten individual digits of which are represented by the pulses of FIG. 3E, each coming through the input 11 at a succeeding $T_0$. These pulses are fed, through the buffer and mixer 14, which acts as an OR gate and an isolator, to the input of the complementary flip-flop 15 and to the first stage 13*a* of the shift register 13. Also at $T_0$, a pulse D from control flip-flop 21, through shaper 22, causes the register to shift, thereby clearing stage 13*a* for reception of the message pulse E, by shifting its contents to the next stage 13*b*, and causing the output F to leave the register and be applied to the input of complementary flip-flop 15, via buffer 14. Referring to FIG. 3, it will be noted that this output F is delayed by $t_1$ from the time of arrival of message pulse E at the input of the flip-flop. This prevents coincidence of input pulses and insures that each input will have full effect on the flip-flop output. The delay for pulse F may be inherent in the operation of the shift register 13 or may be introduced into the circuit by a delay line or other suitable device as indicated at 13*d* in the block diagram of FIG. 1.

In addition to the ten digit message assumed above, assume also for purposes of explanation that register 13 has five stages with the following arbitrary contents at the start of the message. (See FIG. 3F.)

Stage 1—0
Stage 2—0
Stage 3—1
Stage 4—0
Stage 5—1

Thus, the sum-modulo-two addition of the contents of register 13 before the first message digit arrives will be 0. Hence, this will be the signal of bi-level output of complementary flip-flop 15 which generates the parity digits.

This output signal alternates between zero and one each time a one is applied to its input, and remains unchanged when a zero is applied. Thus, when the first message digit, which happens to be a one (see FIG. 3E), comes through input 11 at $T_0$, the flip-flop 15 rises from its low to its high level. Immediately thereafter, at $t_1$, a one is delivered from the shift register and returns the output G back to its low level. It remains at this level until the second message digit, which also happens to be a one, raises it to the high level at the next $T_0$. This time, however, the immediately subsequent output of the shift register 13 at $t_1$ is a zero. Consequently, the flip-flop output at G remains at the high level and continues there through the arrival of the third message digit, because this digit also happens to be a zero and therefore does not complement the flip-flop.

The third digit output of the shift register 13 is a one which causes the output at G to complement, at $t_1$, to the low level. The fourth message digit is a one, and accordingly, the output at G rises again and stays at the high level through the arrival of the fourth output digit of the shift register and the fifth message digit and shift register digits, because they are all zeros.

With the arrival of the sixth message digit, which is a one, the output at G complements to the low level at $T_0$, but immediately rises again to the high level at $t_1$ because the sixth digit output of the shift register is a one. The seventh message digit, being a one, complements the flip-flop to the low level, and again the seventh digit output of the shift register returns it to the high level at $t_1$, since it also is a one. The output at G continues at this high level through the eighth message digit and shift register output because these are both zeros.

The ninth message digit, which is a one, complements the output at G to its low level; and, the ninth digit output of the shift register which is also a one immediately, at $t_1$, returns the output to the high level. The tenth message digit, a one, complements the flip-flop to its low level of output where it remains, since the tenth digit output of the shift register is a zero.

The output pulses of the parity digit generating flip-flop 15, just described, are connected to the parity digit sample gate 16 which functions as a conventional AND gate and produces an output at H corresponding to the signal level G at the time a control pulse C along the parity digit control line from flip-flop 21 arrives at the gate 16. Thus, the first output at H is a zero because the output G is at a low level when the first gating pulse C arrives over the control line from flip-flop 21. Similarly, the output at H is representative of the output at G at successive parity digit sampling times to produce the following sequence of parity digits: 0 1 0 1 1 1 1 1 1. This is evident from a comparison of the pulses at FIGS. 3, G and H, and can be verified by a sum-modulo-two addition of the contents of the register 13 after each shift [see FIG. 3F (1)].

The parity digit generated at 15 and gated at 16 is applied, as one input, to the mixer 17. The other input to the mixer 17 is the message digits J coming from the message sample gate 19 which has as its input the output I of the first stage 13$a$ of shift register 13. The output of stage 13$a$ is at a high level when the incoming message digit is a one and at a low level when it is a zero. The message sample control line gates the input I through the gate 19 in accordance with the pulses B generated at the flip-flop 21.

Since pulses B and C which gate the message and parity digits respectively are at alternate outputs of flip-flop 21, they cause the message and parity digits to follow each other cyclically through the mixer and produce an output K which takes the format of a succession of message digits each followed by a parity digit.

Figure 4:
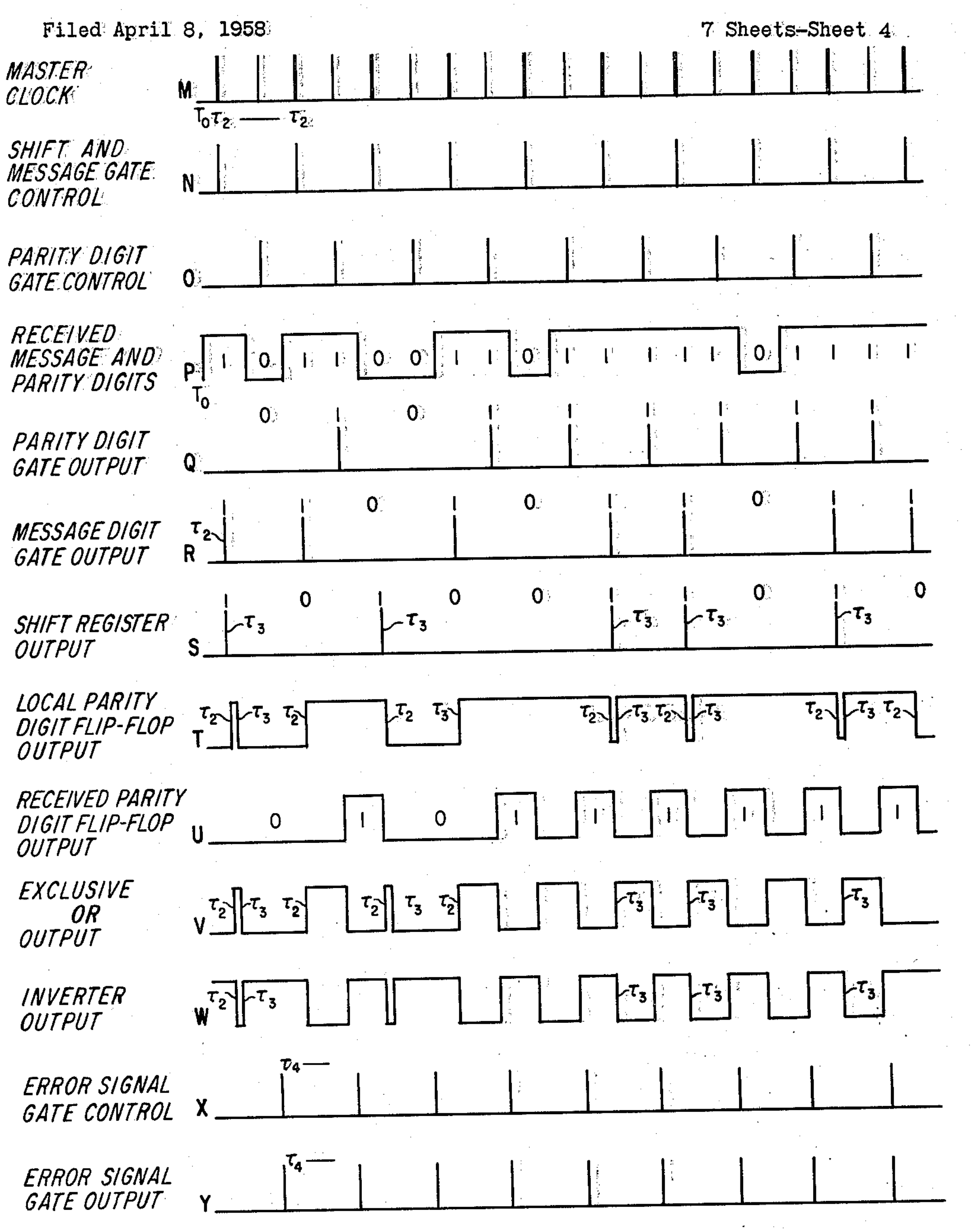
FIG. 4 is a similar representation of signal and control pulses at reference points in the block diagram of FIG. 2.

In the receiver section, referring to FIGS. 2 and 4, timing pulses M are applied to input 35 from a master clock or synchronizing circuit (not shown). These pulses occur at the bit rate of the system, i.e. a single pulse for every message and every parity digit.

From input 35 the clock pulses are fed to complementary flip-flop 36 having one output connected through pulse shaper 37 to provide pulses N which: shift the register 25, control the message gate 24, and reset the flip-flop 30. The other output of flip-flop 36 is connected, through pulse shaper 39, to provide pulses O which control the parity digit gate 31 and, through a delay 40, produce the pulses X which control the error signal gate 33.

The master clock which thus provides the initial pulses at 35 for the control and synchronizing system of the receiver section is delayed with respect to the clock serving a similar function in the transmitter section in order that the gating pulses N and O may occur at $t_2$ and coincide with the center body portion of the message and parity digits instead of their leading or trailing edges, thereby increasing the reliability of their gating function.

The message and parity digit input at 23 is represented by FIG. 4P. These pulses are applied to the gates 24 and 31; and separation between message and parity digits is accomplished by pulsing the message digit gate 24 with a control pulse N, occurring at substantially the center of each message digit interval, and similarly controlling the parity digit gate 31 with a pulse O occurring at the center of each parity digit pulse interval.

The output Q of the parity digit gate comprises a series of zero and one signal combinations at parity digit intervals, with each interval registering a zero or a one in accordance with whether the input P was at its high or low level when the gate 31 was activated by a pulse O. These signals represent the received parity digits. They are applied to the SET input terminal of flip-flop 30 where they cause a pulse to occur in the output signal U each time the parity digit received is a one and no signal output when the received parity digit is a zero, because the flip-flop 30 is reset to zero during every message digit interval by a pulse N. The signal U from the flip-flop 30 is applied, as one input, to the exclusive OR comparison circuit 29 which has as its other input a locally generated parity digit derived from the received message digits.

The message digits are separated from the parity digits of the input signal by means of gate 24, in the manner explained above. The output R of gate 24, representing the received message digits, is applied to the first stage 25$a$ of shift register 25 and also, through buffer and mixer 26, to the input of complementary flip-flop 27.

The output signal S of the final stage 25$e$ of the shift register 25 is applied at $t_3$, also through buffer 26, to the input of flip-flop 27. The delay $t_3$ of the signal from the shift register is either inherent in the operation of the register or is applied by a suitable device 28 and serves the same purpose as delay $t_1$ in the transmitter section, viz., preventing coincidence of message and shift register output pulses at the flip-flop input.

The message output may be taken in parallel from the successive stages of the register 25 as shown at 41 serially from the final stage 25$e$ as shown at 42, or from other suitable taps.

The complementary flip-flop 27 is operated by input signals R and S to perform a sum-modulo-two addition of the contents of the shift register 25, thereby generating a parity digit signal T in the manner already explained for the equivalent circuit in the transmitter section.

Both the locally generated parity digit signals T and the received equivalents U are fed to the exclusive OR circuit 29 for comparison purposes. This circuit has an output only when a pulse T occurs without a pulse U or vice versa. Thus, if the parity digits generated and received are the same (i.e. both ones or both zeros) there will be no output from the circuit 29 at this particular time; but, if either provides a one input while the other provides a zero, the circuit will detect the disparity and indicate it by an output signal pulse. (See FIG. 4V.)

This output V of the comparison circuit 29 is processed through an inverter 32 to provide positive pulses instead of a zero voltage reference when the parity digits are similar. The inverter output signal W is applied to an error signal gate 33 under the control of a series of pulses X derived from the master clock through the flip-flop 36 via output O of pulse shaper 39 processed through a delay circuit 40 to produce gating pulses at $t_4$, a period of delay suitable to provide for operation of the rest of the circuitry before an accept or reject signal is delivered.

As long as the input to gate 33 is a positive pulse (the result of similarity of the compared digits) at the time a gating pulse X is applied, a steady series of pulses Y will be applied through a terminal 34 to indicate no errors. As soon, however, as the parity digits do not check, absence of one or more pulses Y will activate an error indicating alarm or initiate corrective action such as re-transmission of a block of digits etc. The use of positive pulses to indicate correct reception provides for "safe failure" by indicating errors for most types of circuit non-performance.

In the exclusive OR circuit output of FIG. 3V there are two signal spikes corresponding to the two delays between $t_2$ when a message digit one complemented the flip-flop 27 and $t_3$ when it was re-complemented by a one output of the shift register 25. There are also square pulses T overlapping the received parity digit representing output U of flip-flop 30. None of these spikes or pulses, however, coincide with a parity digit sampling period determined by the pulses O. Consequently, they do not affect the operation of the circuit.

During the critical periods when the output V of the comparison circuit 29 is representing similarity or dissimilarity between the received and locally generated parity digits, there is no output pulse shown, because we have assumed no error in the transmission and consequently the received and locally generated parity digits have checked in each instance.

In the preceding description of the operation of the shift registers in both the transmitter and receiver sections of this error detector, a given initial content of the registers has been assumed. As long as the system is in continuous operation, preceding message digits provide the shift register contents for generating the parity digits for succeeding message digits. At the termination of the message, however, a suitable succession of digits must be processed through the system to insure that the last message digit is processed through the final stage of the shift register in order that it may be checked to the same degree of accuracy as the rest of the message. It is also essential that the contents of both the transmitter section shift register 13 and the receiver section shift register 25 be in conformity at the start of the next message. This clearing of the last message digit and also the conditioning of the transmitter and receiver shift registers can be accomplished by applying suitable and similar prepared programs from a permanent storage such as a magnetic tape to the respective shift register inputs at the proper time.

The error detection system as described above provides a continuous check on every message digit passing from the transmitter to the receiver. This type of check is called "convolutional" because each digit of the message is verified by checking it against previously verified digits of the message itself. Such a system is, for most practical purposes, invulnerable to undetected errors. There are, however, some mathematical possibilities of undetected message digit errors. An example of such an error is shown in FIG. 5.

If a successive message digit and parity digit are both received incorrectly, the errors will be compensating. The mistake produced by the message digit in the sum-modulo-two addition of the shift register will generate an incorrect parity digit in the receiver which will correspond with the incorrect parity digit received, and the result, as far as the reception of these two digits is concerned, will be no indication of error. If the next message and parity digits, however, are both correct, the erroneous message digit, which will have now been shifted to the second stage of the register 25 and is, therefore, reflected in the condition of flip-flop 27, will generate a false parity digit at the receiver which will not correspond with the correct parity digit received and an error will be indicated by the system.

An examination of FIG. 5 will demonstrate, however, that a single combination of successive message digit and parity digit errors can pass undetected through the system if all of the succeeding parity digits until the last erroneous message digit has been shifted from the register 25 are also incorrect. The occurrence of such a succession of errors is mathematically possible but highly improbable and its probability can be pushed beyond practical limits by increasing the number of stages of the shift register 25 to a point where there is no practical possibility of receiving the necessary steady series of correct message digits followed by incorrect parity digits. This type of error is referred to as a "single message digit error."

In addition to the single error, there is another possibility of faulty transmission which is called the "double message digit error." This has reference to two successive incorrect message digits with an incorrect parity digit between them. Two types of double errors are shown in FIGS. 6 and 7.

In FIG. 6, two succeeding message digits which are both the same are both received incorrectly and also the parity digit between them. In FIG. 7, successive message digits which are different and the parity digit between them are all received incorrectly.

Other possibilities (not shown) include separated incorrect message digits with all the parity digits between them also incorrect. If either of the cases shown should occur in the detection system so far described, the erroneous parity digit would permit the first incorrect message digit to be received and enter the shift register undetected. Thereafter, the second erroneous message digit would compensate for the first, and both would be undetected until the first shifted from the register. If another erroneous parity digit were received at this time the resulting error from the incorrect message digit incorrectly complementing flip-flop 25 would be undetected; and, then, the second incorrect message digit shifting from the register would correct the condition of flip-flop 25. Hence, the double error would pass through the system undetected. In order to decrease the mathematical chances of this possibility and make its occurrence impossible for most practical purposes, the modification of FIGS. 8 and 9 are suggested.

The arrangement of FIG. 8 features a modified shift register for the transmitter section of an error detector and the arrangement of FIG. 9, a similarly modified shift register for the receiver section. In both of these figures the block diagram has been considerably simplified for brevity of explanation. It is to be understood that, except for the shift registers themselves, the transmitter and receiver sections function substantially as already explained in connection with the other figures.

Referring to FIG. 8, the transmitter section comprises an input channel 41, a shift register 42, a parity digit generating flip-flop 43, a mixer 44, and an output channel 45. This transmitter section functions substantially in the same manner as that of FIG. 1. A series of message digits are received through channel 41 and applied simultaneously to: the mixer 44, the first stage **42*a* of shift register 42 and the input of complementary flip-flop 43. The output of register 42 is also connected to the input of flip-flop 43. In the mixer 44 parity digits, corresponding to the output of flip-flop 43**, are inserted after each of the message digits.

The only substantial difference in this modification is that, instead of merely complementing flip-flop 43 with signals corresponding to the ones and zeros of the input and output of register 42 to obtain a sum-modulo-two addition of its contents, two additional taps are provided at 46 and 47. These taps which are connected to the conductors between stages of the register provide inputs to the flip-flop from the input and output respectively of the third stage **42*c* of register 42**.

The effect of thus bracketing the stage 42*c* is to create a "blind spot" in the addition of the register contents. Since a sum-modulo-two addition in effect amounts to merely counting the ones in the group of digits to be added and recording a zero if the count is even and a one if it is uneven, the content of any single stage in the register can in effect be subtracted from the total simply by adding it to the total. The net result as far as an odd-or-even count is concerned is the same whether the digit be added or subtracted.

Tap 46 performs this function of adding what goes into stage 42*c* to get the effect of subtracting it. Then, tap 47 returns to the effective contents of the register the contents of stage 42*c*. For example, if on a given shift a one enters stage 42*c*, tap 46 complements the flip-flop 43 to in effect subtract this one from the total running count indicating the sum-modulo-two contents of all of the stages of register 42. On the next shift tap 47 returns this one to the total count so that it will be represented in the output of flip-flop 43 until the digit is finally shifted from the output of the final stage 42*n*. Suitable delays $t_5$ and $t_6$ which are either inherent in the system or artificially produced are provided to insure that signals from taps 46 and 47 will not coincide with other signals at the input to flip-flop 43 and thus lose their effect on the system.

FIG. 9 shows a similar modification of the receiver section. Although its block diagram has also been simplified, its operation is similar to the receiver of FIG. 2, except for the shift register.

This modified receiver comprises an input channel 48, a separator 49, a comparator 50, a shift register 51, a parity digit generating flip-flop 52, and an output channel 53 whence are derived the message accepting or rejecting signals.

The received message and parity digits are processed through separator 49 with the parity digits being applied to the comparator 50 and the message digits being applied to the first stage of shift register 51 and the input of complementary flip-flop 52. The output of register 51 and taps 54 and 55, bracketing the third stage 51*c* are also connected with suitable delays and to the input of flip-flop 52. Taps 54 and 55 accomplish the same purpose as taps 46 and 47 in FIG. 8, viz. making this stage a "blind spot" and effectively removing it from the count of sum-modulo-two addition of the register contents.

The effect of thus removing the third stage of the shift register from the sum-modulo-two total of its contents in both the transmitter and receiver sections increases still further the improbability of double message errors being undetected, as explained below.

It has already been stated that two successive message digits can enter the shift register undetected if they have an incorrect parity digit between them. Likewise they can leave the register undetected if the parity digit received when the first incorrect message digit shifts from the register also happens to be incorrect. Although this is a highly improbable occurrence, the addition of a blind spot in the register, as explained in the modification of FIGS. 8 and 9, makes it necessary that the parity digits received when each of the erroneous message digits enters and leaves the blind stage of the register also be in error to compensate for the fact that the erroneous digit will produce an incorrect parity digit by falsely complementing the parity digit generating flip-flop 52.

The preceding discussion of single and double errors has been directed to detection of incorrect message digits. Incorrect parity digits have been considered only in so far as they affect detection of erroneous message digits. They are not a matter of concern per se because incorrect parity digits alone can only result in correct messages being rejected, never in incorrect messages being accepted. Therefore, they do not produce false information. Also, they are effective on the system only at the time of reception because they are not stored like the message digits.

The basic error detector described and its modifications provide a means for detecting in a received binary message digits which have been changed from the original text by faulty transmission or other factors. Because of its convolutional characteristics, i.e. checking each incoming digit of the message against already verified digits of the message itself, it provides for extremely reliable communication. Any practical degree of probability against failure to detect either single errors (or an odd total) can be achieved by increasing the number of stages in the parity digit generating shift registers. Also, the improbability of failing to detect double errors (or any even number) can be increased to the degree of satisfaction desired by providing taps, as described, to create one or more blind stages in the parity digit generating shift registers. The cancellation of one stage was explained in the modification described. Any other number of stages can be effectively canceled by similarly bracketing them with taps from the register to the input of the complementary flip-flop. The number of blind stages and their location will be a function of the requirements and transmission characteristics of the communication links concerned.

Block diagrams have been used throughout the explanation because the individual circuits employed are well-known and have been sufficiently identified for those skilled in the art to arrange them, or practicable substitutes, in the novel combination described. Specific circuits answering the requirements of the block diagram are found in such standard references as: Arithmetic Operations in Digital Computers, R. K. Richards, Van Nostrand Co., 1957; Pulse and Digital Circuits, Millman and Taub, McGraw-Hill, 1956; and Phase One, Final Report for Teletypewriter Error Correcting Group AN/GGA, prepared for the United States Air Force by Melpar, Inc. in October of 1956.

A basic data processing system embodying the invention in a novel combination of components to provide an extremely reliable error detection system has been described. The invention, however, is not limited to the specific system disclosed, but is to be given the scope of the following claims.

What is claimed is:

1. In an electronic data processing system, means for performing sum-modulo-two addition of a plurality of binary digits which comprises, a shift register having a plurality of stages, means for shifting said digits to be added through said register, a digit input connection to said register, a digit output connection to said register, a single stage bi-stable element arranged for storing the sum-modulo-two addition of the contents of said register before each of said register shifts; said bistable element having a single complementing input, means connecting said input connection to said complementing input, means connecting said output connection to said complementing input, and means including signal delay means in one of said connecting means whereby said bistable element by complementing in response to binary "one" signals at said input and output connections each time said register shifts performs sum-modulo-two addition of the contents of the register.

2. In an electronic data processing system, means for performing sum-modulo-two addition of some of a sequence of digits without having other digits of said sequence affect the total, which comprises: a multi-stage shift register having a plurality of stages; an input connection to the first stage of said register; an output connection to the last stage of said register; means for shifting said sequence of digits through said register; a single stage bi-stable element arranged for storing the results of sum-modulo-two addition; said bistable element having a single complementing input connected to said input and output connections, to the input of the first of a consecutive series including at least one intermediate stage of said register and to the output of the last stage of said series; and, means including signal delay means of different duration in the different ones of said connections to said complementing input whereby said bistable device performs sum-modulo-two addition of the contents of said register, except for said intermediate series of at least one stage, each time said register shifts.

3. In an error detection device for a binary digital communication system, a parity digit generator which comprises: a multi-stage shift register having input and output connections; a single stage complementary bi-stable element arranged for storing the sum-modulo-two addition of the contents of said register before each of said register shifts; said bistable element having a single input connected to the input and output connections of said register means for shifting the message digits processed by said system through the successive stages of said register; and, means including signal delay means of different duration in said register input and output connections for performing with said single stage element sum-modulo-two addition of the message digits entering and leaving said register and said stored sum-modulo-two addition.

4. For a binary digital communication system employing a convolutional error detecting technique, means for producing parity digits from message digits which includes the combination of a multi-stage shift register, means including a register input connection for applying message digits to the first stage of said register, a register output connection, and means for performing sum-modulo-two addition of the contents of said register each time one of said message digits enters said first stage, said addition means comprising a single stage bi-stable element arranged for storing the sum-modulo-two addition of the contents of said register before each of said message digits enters said first stage and having a single complementing input, means connecting said register input and output connections to said complementing input, and means including signal delay means in one of said complementing input connecting means for deriving said parity digits from the output of said bi-stable element.

5. For a binary digital communication system utilizing a convolutional error detecting technique, means for producing parity digits from message digits, which comprises: a multi-stage shift register having an input connection and an output connection; means for applying said message digits sequentially to said input connection; means for shifting said digits through said register; means for performing a sum-modulo-two addition of the contents of said register each time said register shifts one of said digits including a single stage bi-stable element arranged for storing the sum-modulo-two addition of the contents of said register before each of said digit shifts; said bistable element having a single complementing input connected to said input and output connections; means for cancelling digits from the total of said addition; said means including connections from the input and output of register stages containing said digits to said complementing input of said bi-stable element; and means including signal delay means of different duration in said different connections to said complementing input for deriving said parity digits from the output of said bi-stable element.

6. In an electronic error detection system from a binary digital communication link, a transmitter section which comprises: a mixer circuit; a source of synchronizing and control pulses for controlling said mixer circuit; a message input channel; means for applying digit representing signals from said input to said mixer circuit; means including a multi-pulse storage device and a complementary element arranged for storing the sum-modulo-two addition of the contents of said storage device and being connected to its input and output for producing parity digit representing signals by performing an effective sum-modulo-two addition of digit-representing signals entering said storage device and digit-representing signals leaving said storage device and said stored sum-modulo-two addition; means for applying said parity digit representing signals to said mixer circuit; and, means for deriving from said mixer an output signal representative of the combination of said message and parity digit signals.

7. In an electronic error detection system for a binary digital communication link, a receiver section which comprises the combination of: a source of synchronizing and control pulses; a received message and parity digit signal input channel; means for separating said received message and parity digits; a comparison circuit; means for applying signals representing said received parity digits to said comparison circuit; means including a multi-pulse storage device and a single stage complementary element arranged for storing the sum-modulo-two addition of the contents of said storage device connected to its input and output for generating local parity digits by performing an effective sum-modulo-two addition of digit-representing signals entering said storage device and digit-representing signals leaving said storage device and said stored sum-modulo-two addition; means for applying signals representing said local parity digits to said comparison circuit; and means for deriving from said comparison circuit message accepting or rejecting signals.

8. For a binary digital communication system having a transmitting and a receiving station an error detector which comprises at each station: a multi-stage shift register; means for separately applying the successive individual binary digit-representing signals of the message being communicated to the initial stage of said registers; means for shifting said successive digit signals sequentially from one stage to another through said register; and, means including a multi-pulse storage device and a single stage complementary element arranged for storing the sum-modulo-two addition of the contents of said storage device before each of said digit's shifts and being connected to its input and output for performing a sum-modulo-two addition of digit-representing signals entering said register and digit-representing signals leaving said register and said stored sum-modulo-two addition.

9. For a binary digital communication system having a transmitter section and a receiver section a system for detecting transmission errors which comprises: at the transmitter section, means for applying a message in the form of successive binary digit representing signals, a shift register, means for processing said message digits through said register, means including a shift register and a complementary device arranged for storing the sum-modulo-two addition of the contents of said shift register before each of said digits is processed, said device being connected to the input and output signal terminals of said register for generating a parity digit by performing a sum-modulo-two addition of the contents of said register each time it shifts a digit, and means for inserting in the message format after each message digit the parity digit generated when that particular message digit entered the first stage of the shift register; and, at the receiver section, means for separating the received message and parity digits, a shift register, means for processing said message digits through said register, means including a shift register and a complementary device arranged for storing the sum-modulo-two addition of the contents of said shift register before each of said digits is processed for generating a parity digit by performing a sum-modulo-two addition of said stored sum-modulo-two addition and the input to and output from said register each time it shifts a digit, means for comparing the parity digits received and generated at said receiver section, and means responsive to said comparison for controlling acceptance or rejection of the message being received.

10. For a binary digital communication system having receiving and transmitting stations a system for detecting errors in transmission between said stations, which comprises: at the transmitting station, a message input channel; a shift register; a complementary flip-flop arranged for storing sum-modulo-two addition of the contents of said shift register; a mixer; means connecting said input channel to: the first stage of said register, the input of said flip-flop, and said mixer; means connecting the final stage of said register to the input of said flip-flop, means connecting the output of said flip-flop to said mixer; and, control means whereby: said flip-flop performs a sum-modulo-two addition of said stored sum-modulo-two addition and the input to and output from said register as each message digit enters the register, and the result of said addition is inserted into the mixer as a parity digit behind said message digit in the message format; and, at the receiving station, an input channel; a received parity digit gate and processing circuit; a received message digit gate and processing circuit; a shift register having the same number of stages as the shift register at the transmitting section, a complementary flip-flop arranged for storing the sum-modulo-two addition of said receiving shift register; a comparison circuit; an output circuit; and connection and control means whereby: message digits are processed successively through said message gate and receiver register, said complementary flip-flop performs a sum-modulo-two addition of said stored sum-modulo-two addition and the input to and output from said register each time a message digit enters the register to generate a local parity digit, the result of said addition is connected to said comparison circuit, each received parity digit is also connected through said parity gate to said comparison circuit as its preceding message digit enters the shift register, and a control signal is produced in said output circuit if said local and received parity digits are not the same.

11. For a binary digital communication link having a transmitting and a receiving station an error detecting system which comprises: at the transmitting station, a message input channel; a bi-stable output flip-flop having a complementing input connected to said message input channel; a multi-stage shift register having its first stage connected to said message input and its final stage connected through a signal delay device to said flip-flop input; said bistable flip-flop being arranged for storing the sum-modulo-two addition of the contents of said shift register; a mixing circuit connected through a message sample gate to said message input channel and through a parity digit sample gate to the output of said flip-flop; a source of control pulses connected: to said register to advance its contents from one stage to another, to said message sample gate to control the transmission of message digits to said mixer, to said parity digit sample gate to control the transmission of parity digits to said mixer, said control pulses being so sequenced that each message digit enters the first stage of the shift register and the mixer at substantially the same time and the parity digit resulting from the consequent advancement of the shift register enters the mixer before the next successive message digit; and, at the receiving station, a received signal input channel; a separator circuit including a message digit gate and a parity digit gate; a bi-stable output flip-flop having a complementary input connected to the output of said message digit gate; a multi-stage shift register having the same number of stages as the shift register at the transmitting station with its input connected to said flip-flop input and its output connected via a signal delay device to said flip-flop input thereby to generate a local parity digit corresponding to each received message digit; said bistable flip-flop being arranged for storing the sum-modulo-two addition of the contents of said shift register; a comparison circuit having: a first input connected to the output of said flip-flop, a second input connected to said parity digit gate, and an output connected to a message accepting or rejecting circuit; and, a source of control pulses connected: to said message digit gate and said parity digit gate to accomplish separation between received parity and message digits, to said shift register to advance message digits therethrough, and to said comparison and accepting or rejecting circuits to synchronize comparison of the received and locally generated parity digits corresponding to a particular message digit and the error detecting response thereto.

12. The invention according to claim 11 and wherein the complementing input of said flip-flops at both said transmitting and receiving stations is connected to the input and the output of a successive series including the last one of the intermediate stages of their respective shift registers and signal delay devices of different time duration are provided in the different connections between said complementing inputs and said register stages.

13. For a binary digital communication error detecting system of the type wherein a sequence of check digits is generated to alternate in a transmission format with message digits and said check digits are determined by sum-modulo-two addition of the component digits of successive sequences of said message digits, means for performing said addition comprising: a multi-stage electronic pulse shifting register having a digit input connection and a digit output connection; means for shifting pulses corresponding to message digits through said shifting register; a bistable device arranged for storing the sum-modulo-two addition of the contents of said shifting register; said bistable device having a complementing input; means connecting said input connection to said complementing input; means connecting said output connection to said complementing input; and means, including signal delay means in one of said connecting means, whereby said bistable device by complementing in response to binary "one" signals at said input connection and at said output connection each time said register shifts, performs said modulo-two addition.

References Cited in the file of this patent

UNITED STATES PATENTS

| | | |
|---|---|---|
| 2,719,959 | Hobbs | Oct. 4, 1955 |
| 2,857,100 | Franck et al. | Oct. 21, 1958 |
| 2,894,684 | Nettleton | July 14, 1959 |
| 2,951,230 | Cadden | Aug. 30, 1960 |

OTHER REFERENCES

"Coding For Noisy Channels," IRE 1955—National Convention Record, Part 4, pages 37–47.

"Faster, Faster" by W. Eckert et al., McGraw-Hill Book Co., 1955 (p. 101 relied on).